United States Patent [19]

Watanabe et al.

[11] Patent Number: 5,535,410
[45] Date of Patent: Jul. 9, 1996

[54] PARALLEL PROCESSOR HAVING DECODER FOR SELECTING SWITCH FROM THE GROUP OF SWITCHES AND CONCURRENTLY INPUTTING MIMD INSTRUCTIONS WHILE PERFORMING SIMD OPERATION

[75] Inventors: Takao Watanabe, Inagi; Tetsuya Nakagawa, Koganei; Yoshinobu Nakagome, Hamura, all of Japan

[73] Assignee: Hitachi, Ltd., Tokyo, Japan

[21] Appl. No.: 335,680

[22] Filed: Nov. 8, 1994

[30] Foreign Application Priority Data

Nov. 19, 1993 [JP] Japan .................................. 5-290468

[51] Int. Cl.$^6$ .................................................. G06F 13/00
[52] U.S. Cl. .................... 395/800; 364/228.3; 364/228.7; 364/229; 364/229.2; 364/231.9; 364/DIG. 1; 395/163
[58] Field of Search ................................ 395/800, 500, 395/400, 425, 375, 162–163; 364/DIG. 1, DIG. 2

[56] References Cited

U.S. PATENT DOCUMENTS

| | | | |
|---|---|---|---|
| 4,891,787 | 1/1990 | Gifford | 395/375 |
| 4,916,652 | 4/1990 | Schwarz et al. | 364/748 |
| 5,212,777 | 5/1993 | Gove et al. | 395/375 |
| 5,239,654 | 8/1993 | Ing-Simmons et al. | 395/800 |
| 5,355,508 | 10/1994 | Kan | 395/800 |
| 5,371,896 | 12/1994 | Gove et al. | 395/800 |
| 5,388,205 | 2/1995 | Cantor et al. | 395/162 |
| 5,398,309 | 3/1995 | Atkins et al. | 395/135 |
| 5,475,856 | 12/1995 | Kogge | 395/800 |

OTHER PUBLICATIONS

Elliott, Duncan G., et al. "Computational Ram: a Memory–SIMD Hybrid and its Application to DSP," IEEE Custom Integrated Circuits Conference, 1992, pp. 30.6.1–30.6.4. (English).

Samuel E. Fineberg et al; "Experimental Analysis of Communication Data–Conditional Aspects of a Mixed–Model Parallel Architecture via Synthetic Computers"; IEEE May 1990.

Thomas B. Berg; "Instruction Execution Trade–Off for SIMD vs. MIMD vs. Mixed Mode Parallelism"; IEEE 1991.

Howard Jay Siegel; "Aspects of Mapping Tanks Onto Parallel Processing Systems" 11–13/Sep. 1991, IEEE.

Primary Examiner—Meng-Al An
Attorney, Agent, or Firm—Fay, Sharpe, Beall, Fagan, Minnich & McKee

[57] ABSTRACT

A parallel processor utilizing a memory cell array for rapidly performing parallel processing by switching between SIMD and MIMD operations depending on the type of problems to be solved. Where SIMD and MIMD operations are mixed in an application, the time loss in the switching therebetween is eliminated so as to enhance the speed of the processing. The parallel processor comprises a two-dimensional memory array for storing data to be operated on; a transfer network for transferring to a group of processing elements the data read in parallel from word lines connected to memory cells in the two-dimensional memory array, the group of processing elements performing parallel processing on the data transferred thereto; signal lines for transmitting an instruction in a SIMD operation mode; an instruction buffer for storing and forwarding parallelly instructions in a MIMD operation mode; and a group of switches for switching between the SIMD and the MIMD operation mode.

3 Claims, 6 Drawing Sheets

| OP - s / OP - m | ( R", G", B", Z" ) |
|---|---|
| INS - z | $Z \leq Z' \Rightarrow$ ( R, G, B, Z ) |
| | $Z' < Z \Rightarrow$ ( R', G', B', Z' ) |
| ( INS - $\alpha, \alpha, \beta$ ) | ( $\alpha$R+$\beta$R', $\alpha$G+$\beta$G', $\alpha$B+$\beta$B', min(Z, Z') ) |
| NOP | ( R', G', B', Z' ) |

PARALLEL PROCESSOR HAVING DECODER FOR SELECTING SWITCH FROM THE GROUP OF SWITCHES AND CONCURRENTLY INPUTTING MIMD INSTRUCTIONS WHILE PERFORMING SIMD OPERATION

BACKGROUND OF THE INVENTION

A typical parallel processor utilizing a memory cell array is discussed illustratively by Duncan G. Elliott, W. Martin Snelgrove and Michael Stumm, "Computational Ram: A Memory-SIMD Hybrid and its Application to DSP" (CICC 30. 6. 1–30. 6. 4; May, 1992). This parallel processor is a semiconductor chip comprising a two-dimensional memory array and a large number of processing elements. The two-dimensional memory array has the advantage of allowing its numerous memory devices connected to word lines to be tapped simultaneously for reading of various data therefrom when any of those word lines are selected. The read data is supplied concurrently to a large number of processing elements. This makes it possible to carry out arithmetic processing at high speed where the numerous processing elements are run in parallel using a common instruction.

As outlined, the above type of parallel processor has been known for its ability to execute the same instruction simultaneously on a plurality of processors configured.

SUMMARY OF THE INVENTION

The prior art example cited above is what is known as a single instruction multiple data stream (SIMD) processor formed on a semiconductor chip. The SIMD processor constitutes a version of the parallel processor. It configures a large number of processors of the same structure carrying out the same operation parallelly based on the same instruction issued by a controller. Each of the configured processors accesses a common storage device via connectors. The processors read and operate on different data, and store the results.

This scheme is suitable for applications where all pixels in a picture frame are to be processed in the same manner, i.e., applications involving the processing of sets such as vectors and arrays. Such applications are being addressed by dedicated processors developed to deal illustratively with scientific/technological processing, image processing, signal processing, data search, pattern matching and associated memory. If the processing involved is highly parallel, these processors perform their operations much more rapidly than ordinary CPU's carrying out serial processing.

Illustratively, drawing applications of three-dimensional computer graphics involve two kinds of processing: highly parallel processing such as one in which the color of the entire picture is changed by the same rule, and processing of low parallelism such as the drawing of a polygon wherein limited portions within the picture are processed individually. With these applications, conventional parallel processors are not expected to provide satisfactory results. For example, suppose that an object comprising curved surfaces and triangles (polygons) is to be drawn for polygon approximation. In that case, the polygons displayed on the same screen are typically all different and cannot be drawn by the same rule in a parallel processing setup. Such polygons must be drawn separately. The processing of this kind should preferably be carried out by MIMD (multiple instruction multiple data stream) computers. A MIMD processor includes all features of a system having its controller functions distributed therein.

It is an object of the present invention to overcome the above and other deficiencies and disadvantage of the prior art and to provide a parallel processor utilizing a memory cell array for dealing with applications using a mixture of a SIMD and a MIMD operation mode, the processor losing little time in switching between the two modes of operations so as to control the configured processing elements efficiently in keeping with the degree of parallelism of the problem to be solved.

In carrying out the invention and according to one aspect thereof, there is provided a parallel processor formed on a semiconductor substrate, comprising: a two-dimensional memory array (MAR in FIG. 1) which is formed on the same semiconductor substrate and which stores data to be operated on; a transfer network (TN) for transferring the data read parallelly from selected word lines (W1–Wm) connected to memory cells in the two-dimensional memory array (MAR); a group of processing elements (PE1–PEn) for performing parallel processing on the data transferred thereto from elsewhere; and switching means (SW-OP) for rapidly switching between a first and a second operation mode using a switching signal, the first operation mode being one in which the processing elements (PE1–PEn) are operated in parallel to execute a common instruction, the second operation mode being one in which different processing elements are operated in parallel to execute different instructions issued thereto. In a preferred structure according to the invention, the parallel processor further comprises an instruction buffer (BUF) for storing either the same or different instructions to be furnished parallelly to the group of processing elements (PE1–PEn) when the second operation mode is in effect, the instruction buffer further having a plurality of instructions written thereto when the first operation mode is still in effect.

In operation, the data read parallelly from selected word lines connected to memory cells in the two-dimensional memory array are sent through the transfer network to the group of processing elements. The processing elements process the transferred data in parallel. The processing elements have the first and the second operation mode. In the first operation mode, the processing elements execute a common instruction in parallel. In the second operation mode, different processing elements execute different instructions in parallel. An operation of the switching means provides switching between the first and the second operation mode. In the first operation mode, the switching means transfers a common instruction simultaneously to the processing elements for parallel processing of the same kind. In the second operation mode, different instructions written to the instruction buffer in the first operation mode are transferred therefrom by the switching means to the processing elements for parallel processing of a different kind each.

With this structure, selecting appropriate word lines in the two-dimensional memory array allows numerous data to be read simultaneously therefrom. One advantage of this structure is that the data thus retrieved may be supplied concurrently to numerous processing elements formed on the same semiconductor substrate. The processing elements perform the so-called SIMD processing when the switching means is used to input a common instruction over a signal line; the processing elements carry out what is known as MIMD processing when a plurality of different instructions are input from the instruction buffer.

While the processing elements are executing a common instruction for SIMD processing, it is possible to write instructions to the instruction buffer in preparation for the upcoming MIMD processing. This scheme further promotes the speed of processing when SIMD and MIMD operations are carried out uninterrupted.

These and other objects, features and advantages of the invention will become more apparent upon a reading of the following description and appended drawings.

DESCRIPTION OF THE PREFERRED EMBODIMENTS

Preferred embodiments of the invention will now be described with reference to the accompanying drawings.

Figure 1:
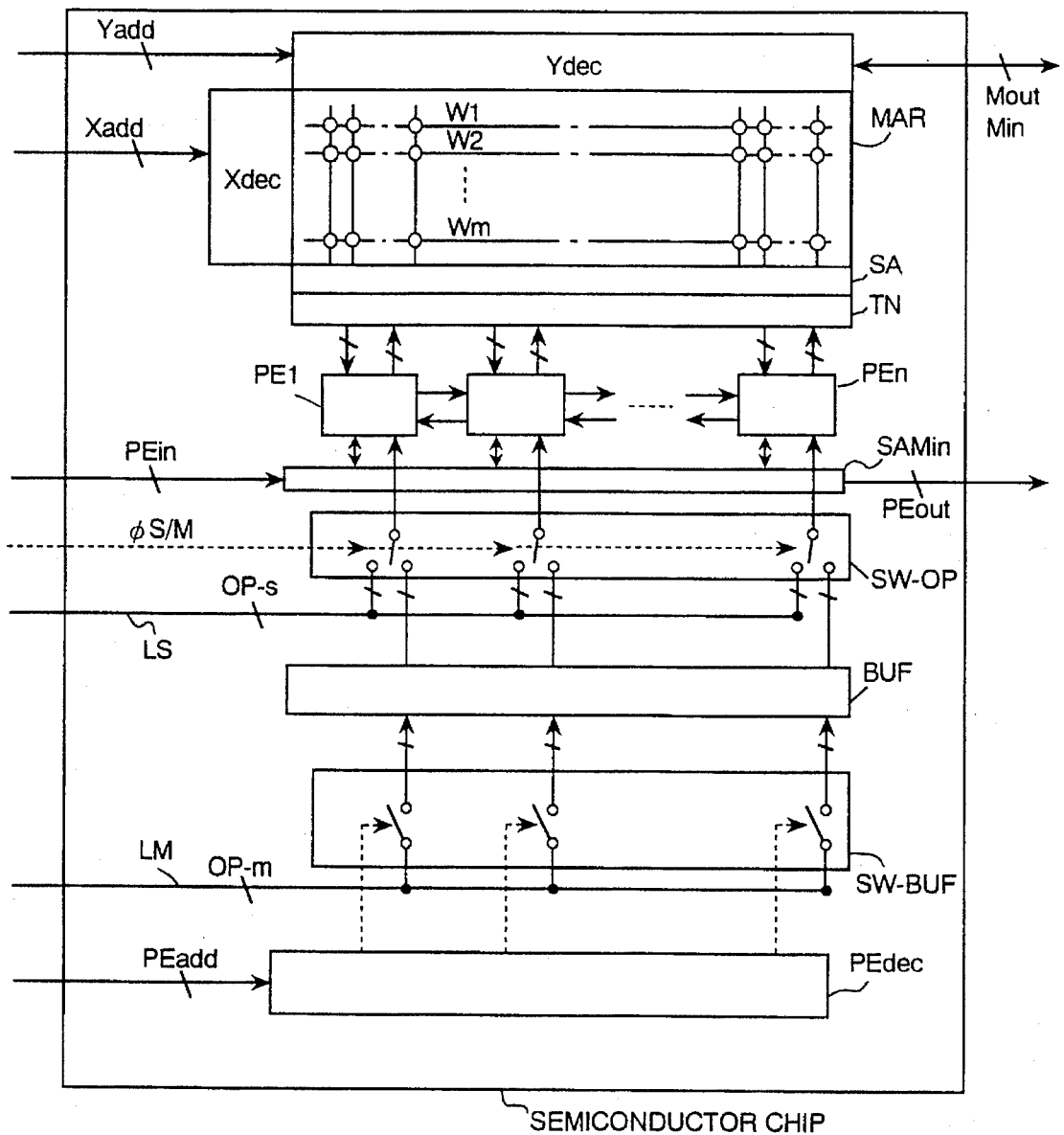
FIG. 1 is a block diagram of a memory-based parallel processor chip practiced as a first embodiment of the invention.

FIG. 1 is a basic block diagram of a parallel processor chip practiced as the first embodiment of the invention. This memory based-parallel processor chip is capable of executing SIMD and MIMD operations continuously at high speed.

As illustrated in FIG. 1, the first embodiment comprises a two-dimensional memory array MAR; a sense amplifier SA for reading and latching data parallelly from individual word lines of the memory array MAR; a transfer network TN for transferring the read data to processing elements PE1, PE2, ... PEn; a serial access memory SAMin for storing serially input data and forwarding them parallelly to the processing elements PE1–PEn, or for parallelly transferring the outputs of the processing elements for serial output; a group of switches SW-OP for switching between SIMD and MIMD operation mode; a signal line LS for transmitting a common instruction OP-s to the processing elements in the SIMD operation mode; an instruction buffer BUF for storing instructions in preparation for the MIMD operation mode; a group of switches SW-BUF for transferring instructions to the instruction buffer BUF; a signal-line LM for inputting instructions OP-m for the MIMD operation mode; and a decoder PEdec for selecting the switch which admits the addresses PEadd of processing elements so as to transfer the instructions OP-m.

How the first embodiment works will now be described with reference to FIG. 1. The processing elements PE1, PE2, ... PEn of the first embodiment perform parallel processing on two kinds of data: data read from the two-dimensional memory array MAR, and data from the serial access memory SAMin. The processing elements PE1–PEn are controlled in one of two operation modes, i.e., SIMD and MIMD operation modes. The two operation modes are switched over by an operation mode switching signal ø S/M controlling the group of switches SW-OP. Specifically, bringing the operation mode switching signal ø S/M High selects the SIMD operation mode. In this mode, the common instruction OP-s is sent over the signal line LS to the processing elements PE1–PEn. In turn, the processing elements PE1–PEn perform the same kind of processing on the supplied data. The MIMD operation mode is selected when the operation mode switching signal ø S/M is brought Low. In the MIMD operation mode, a plurality of instructions are sent in parallel from the instruction buffer BUF to the processing elements PE1–PEn via the group of switches SW-OP. In this case, the different processing elements PE1–PEn carry out different operations on the supplied data. Instructions are written to the instruction buffer BUF as follows: when the SIMD operation mode is in effect with the operation mode switching signal ø S/M held High, the decoder PEdec feeds the addresses of processing elements to the appropriate group of switches SW-BUF. This opens the contacts of these switches and causes the individual instructions OP-m to be written to the designated locations in the buffer BUF.

In the MIMD operation mode, as outlined, the different instructions OP-m are input over the signal line LM and written to the instruction buffer BUF via the group of switches SW-BUF. Those locations in the instruction buffer BUF to which to write the instructions OP-m are controlled by inputting the addresses PEadd of the appropriate processing elements PE1–PEn to the decoder PEdec.

This causes the instructions to be transferred to the processing elements PE1–PEn corresponding to the addresses PEadd. Instruction transfer is effected by bringing the operation mode switching signal ø S/M Low after the necessary instructions have been written to the instruction buffer BUF.

As described, the first embodiment is capable of dealing with applications wherein SIMD and MIMD operations are mixed. The first embodiment is also capable of carrying out the switching of its two operation modes at high speed. This is because the instructions necessary for the next MIMD processing can be written to the instruction buffer BUF while a SIMD operation or another MIMD operation is still in progress.

With the first embodiment, it is possible to mount the above components on the same semiconductor substrate so that the processing elements PE1–PEn, serial access memory SAMin and instruction buffer BUF are located immediately below the two-dimensional memory array MAR. This structure makes it easy to furnish a large number of signal lines between the processing elements PE1–PEn on the one hand, and the memory array MAR, serial access memory SAMin and instruction buffer BUF on the other.

The availability of the above structure translates into very high levels of parallelism in the SIMD and MIMD processing. The structure also makes it possible to make very short and substantially constant two kinds of distances: data transfer distances from the two-dimensional memory array MAR to the processing elements PE1–PEn, and instruction transfer distances from the instruction buffer BUF to the processing elements PE1–PEn. The structure of the first embodiment also makes very short and constant the distances between the processing elements PE1–PEn themselves. One benefit of this structure is the reduced delay time in data and instruction transfer. Another benefit is the reduced dispersion in distances between the processing elements, which makes it easier for the processing elements to synchronize with one another.

The invention may also be applied to other processing setups of diverse kinds.

Figure 2:
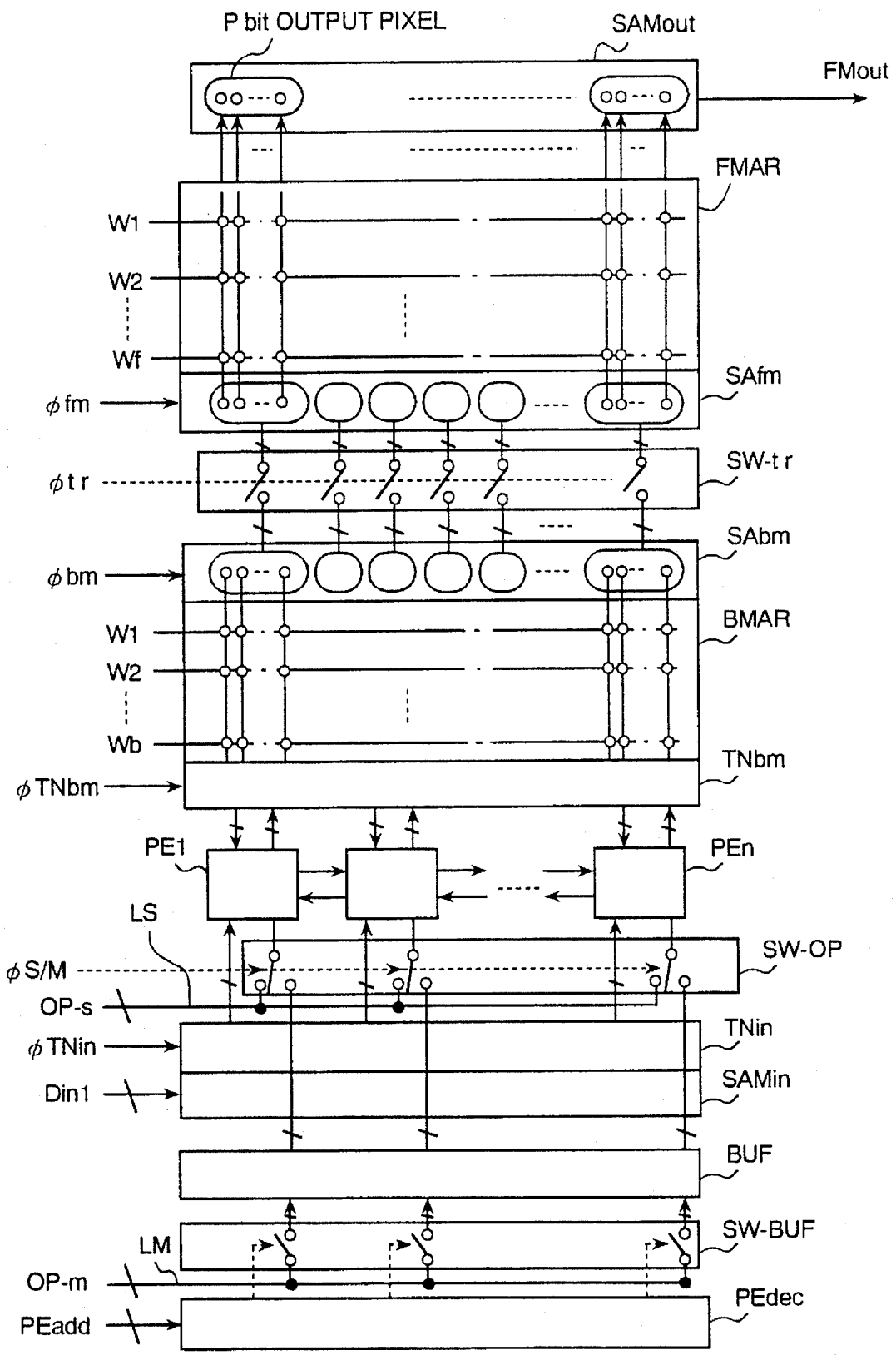
FIG. 2 is a block diagram of an image memory-based parallel processor chip practiced as a second embodiment of the invention.

FIG. 2 is a block diagram of a parallel processor for carrying out the drawing of three-dimensional computer graphics, the processor being practiced as the second embodiment of the invention.

Figure 3:
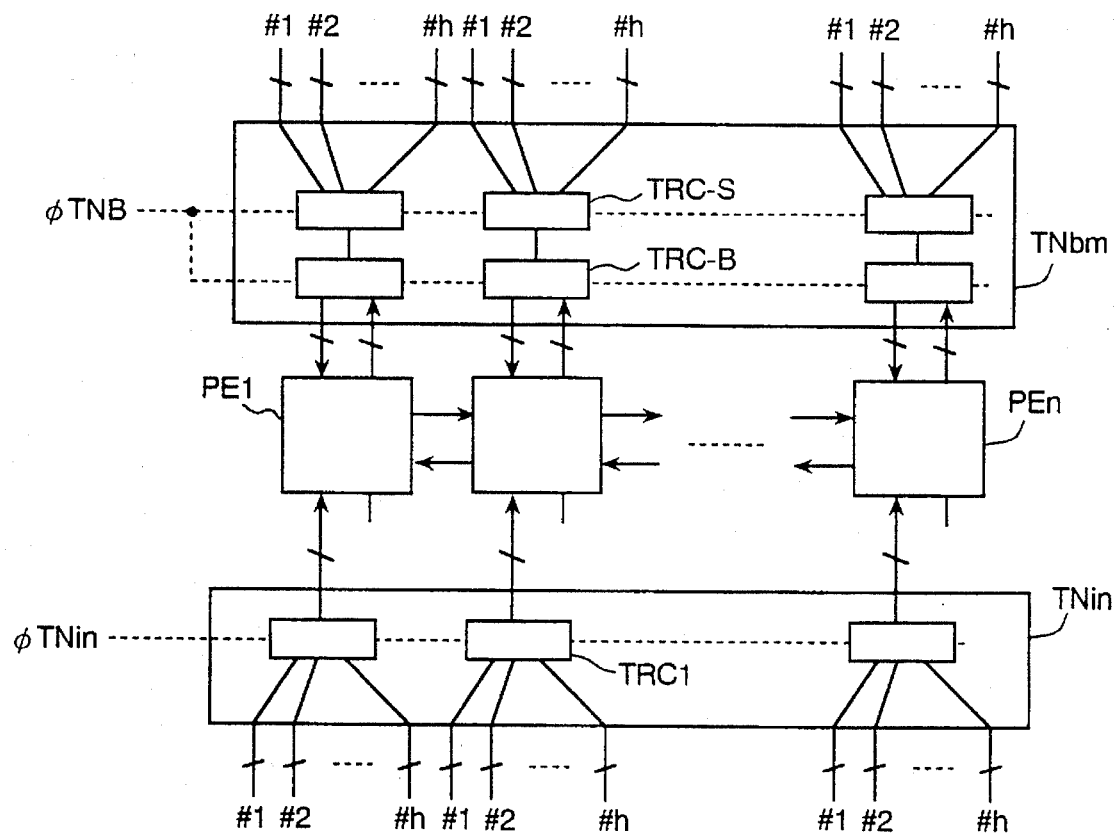
FIG. 3 is a block diagram of a transfer network used by the second embodiment of FIG. 2.
Figures 4A, 4B:
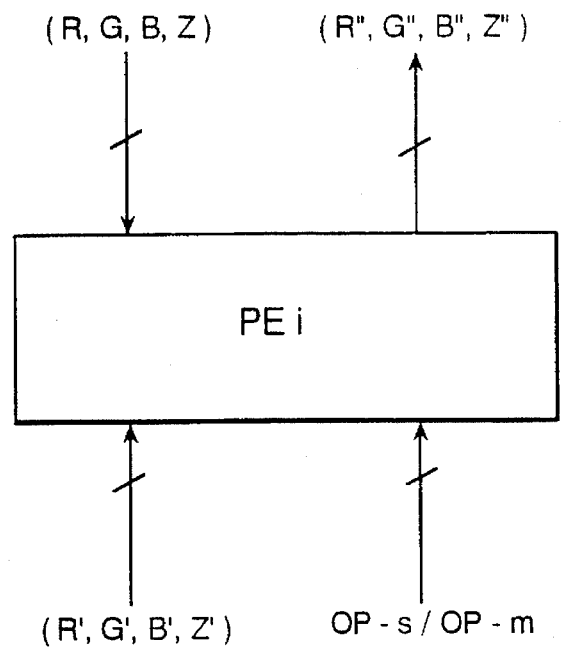
FIGS. 4A and 4B are views illustrating input and output functions of a processing element for alpha blending and Z buffer operations and listing typical contents output by the processing element in response to different instructions.
Figure 5:
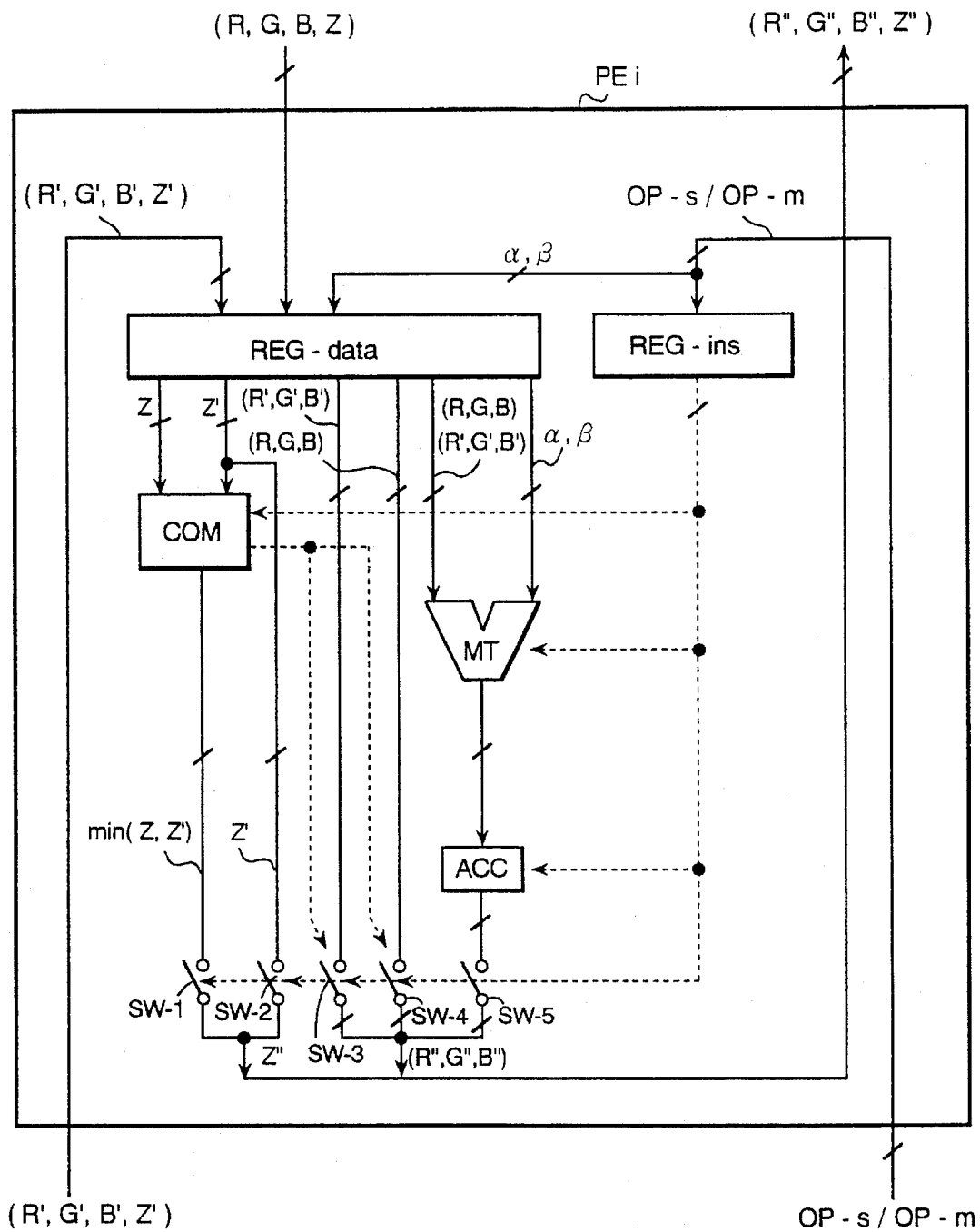
FIG. 5 is a detailed block diagram of the processing element shown in FIG. 4A.
Figure 6:
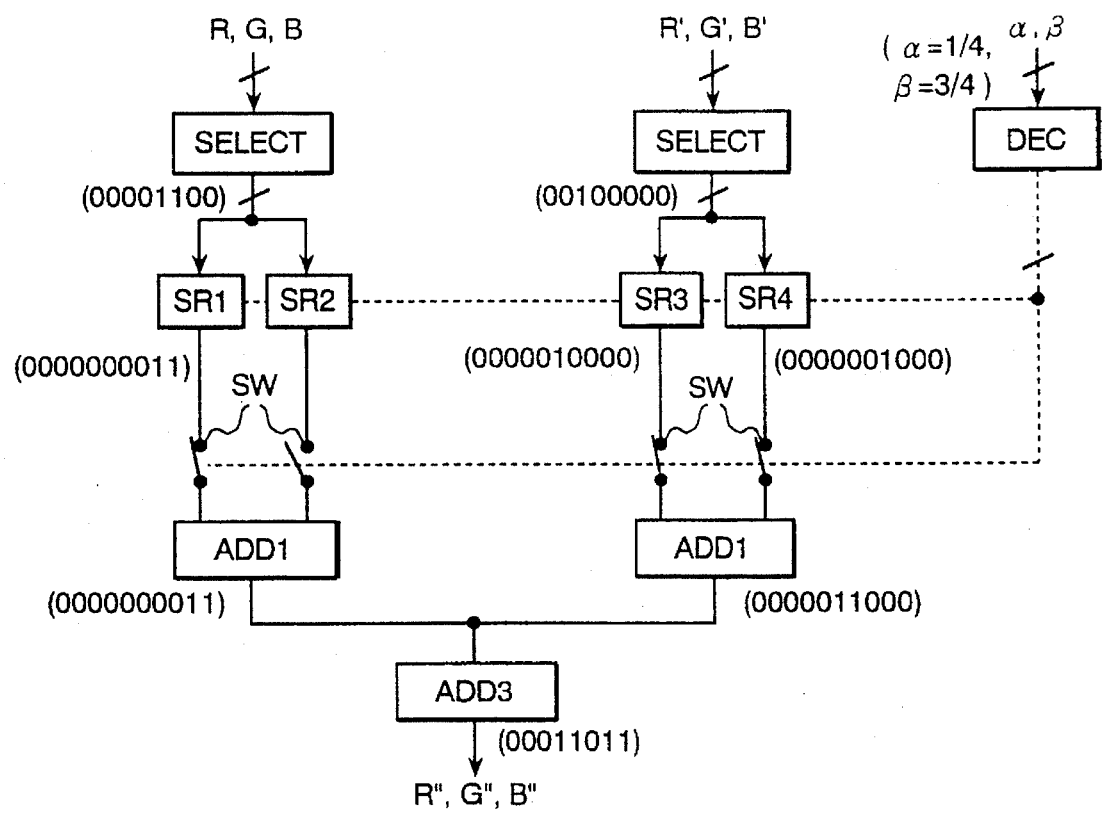
FIG. 6 is a block diagram of a typical alpha blending processing element as a variation of the example in FIG. 5.

FIG. 3 is a block diagram of the transfer network used by the second embodiment of FIG. 2. FIGS. 4A and 4B are views illustrating a processing element with functions for alpha blending and Z buffer operations. FIGS. 5 and 6 are block diagrams giving more detailed illustrations of the processing element shown in FIG. 4A.

The drawing of three-dimensional computer graphics involves writing a three-dimensional object seen from a given point of view into a frame memory corresponding to a two-dimensional screen.

Below is a description of how the second embodiment works in rapidly carrying out Z buffer processing (for expressing the depth of the object) and alpha blending processing (for expressing the transparency of the object) with reference to FIGS. 2 through 6.

Z buffer processing involves comparing the Z coordinate (for expressing the depth) of the data representing a newly input pixel with that of the data at the same address in the frame memory. If the Z coordinate of the data of the newly input pixel is smaller than that of the data at the same address in the frame memory, the data of the newly input pixel is written to the applicable address in the frame memory. The processing makes it possible to express a three-dimensional image in which objects at the front hide those behind.

Alpha blending processing involves taking a weighted linear sum of the data representing the newly input pixel and the data of the existing pixel and regarding the result as the new pixel. This process provides a transparency effect whereby objects behind those at the front are seen through.

The second embodiment of FIG. 2 utilizes a plurality of processing elements to perform high-speed drawing whereby the pixel data on a single line in the screen are processed in parallel. As needed, the second embodiment switches between the SIMD and the MIMD operation mode for control over the processing elements.

Where the pixel data representing the entire screen or a wide area thereof are to be changed, parallel processing of the same kind is carried out per line in the SIMD operation mode. Where pixels in a limited screen area are to be processed with different parameters for the drawing of such objects as polygons, a plurality of polygons may be processed in parallel per line in the MIMD operation mode.

The second embodiment of FIG. 2 comprises: a serial access memory SAMout for outputting image data; a two-dimensional memory array FMAR for storing the image data of a single screen; a sense amplifier SAfm connected to the two-dimensional memory array FMAR; a group of switches SW-tr for transferring data between the two-dimensional memory array FMAR and a buffer memory array BMAR; a sense amplifier SAbm connected to the buffer memory array BMAR; a transfer network TNbm for transferring data between the buffer memory BMAR and a group of processing elements PE1, PE2, ... PEn; a group of switches SW-OP for switching between the SIMD and the MIMD operation mode; a signal line LS for transmitting a common instruction OP-s to the processing elements in the SIMD operation mode; a serial access memory SAMin for storing serially input image data; a transfer circuit TNin for transferring data parallelly from the serial access memory SAMin to the processing elements; an instruction buffer BUF for storing instructions for use in the MIMD operation mode; a group of switches SW-BUF for transferring instructions to the instruction buffer BUF; a signal line LM for inputting instructions OP-m in the MIMD operation mode; and a decoder PEdec for admitting the addresses PEadd of processing elements so as to select the switches through which to transfer the instructions OP-m.

How the second embodiment of FIG. 2 works will now be described. The second embodiment provides screen display by reading data sequentially from the two-dimensional memory array FMAR accommodating the image data of a single screen. Specifically, appropriate word lines of the two-dimensional memory array FMAR are selected consecutively to transfer data to the serial access memory SAMout. The data placed in the serial access memory SAMout are then read therefrom serially. The data representing each pixel are of four kinds: R, G and B representing the densities of red, green and blue respectively; and Z representing the depth. In this case, $\rho$ bits representing R, G and B (usually 8 bits each, amounting to 24 bits) are transferred to the serial access memory SAMout.

If a new screen is displayed or if the point of view or a displayed object is changed, part or all of the contents in the two-dimensional memory array FMAR must be updated. If the current screen is to be replaced by a new screen, the new pixel data destined to the serial access memory SAMin are written directly to the two-dimensional memory array FMAR. This requires operating the switches SW-OP to place the processing elements in the SIMD operation mode in which the instruction OP-s is set for NOP (no operation).

In the above state, the new screen is displayed by having the switches SW-tr activated to write new pixel data, destined to the serial access memory SAMin, parallelly to the memory cells connected to the word lines of the two-dimensional memory array FMAR. The writing of the data is effected via the transfer circuit TNin, transfer network TNbm and the data lines of the buffer memory BMAR.

Where the point of view of an object in the screen is changed, SIMD or MIMD processing is carried out as needed depending on the situation. Illustratively, suppose that the current screen is to be overlaid with another screen for display. In that case, the SIMD operation mode is selected and the entire screen is subjected to alpha blending processing. If an object constituting only part of the screen is to be changed, only the pixels near that object need to be modified. In this case, the MIMD operation is selected and the applicable area is updated one line at a time.

In the MIMD operation mode of the latter case, unchanged pixels on a given line may be processed with the NOP (no operation) instruction, and different pixels may be subjected to alpha blending processing using a different parameter each. Thus a plurality of polygons on a single line requiring a different kind of processing each can still be processed in parallel on a line-by-line basis. In addition, the instructions addressing one line may be prepared in the instruction buffer BUF before the next MIMD operation mode is selected. This arrangement makes high-speed processing possible.

FIG. 3 outlines the constitution of the transfer network used by the second embodiment of FIG. 2. As described earlier, with the processing elements PE1–PEn located immediately below the buffer memory BMAR, the second embodiment will make it easier for the processing elements to synchronize with one another thanks to the reduced delay time in data transfer and the reduced dispersion in distances between the elements. However, because the pitch of the data lines connected to the memory array FMAR is generally small, the processing elements PE1–PEn cannot be located in the pitch of the data lines corresponding to one pixel. In such a case, as shown in FIG. 3, the processing elements PE1–PEn may be located in the pitch of the data lines corresponding to h pixels.

In FIG. 3, the transfer network TNbm switches correspondence between the data lines of the buffer memory BMAR and the processing elements PE1–PEn. A transfer circuit TRC-S constitutes an h-to-1 selector, and a circuit TRC-B is a temporary buffer circuit. Upon data transfer from the buffer memory BMAR to the processing elements PE1–PEn, the data of h pixels read from the buffer memory BMAR are sent to the transfer circuit TRC-S. From the data representing h pixels, the transfer circuit TRC-S selects one-pixel data. The selected data is transferred via the temporary buffer circuit TRC-B to the processing elements PE1–PEn. Conversely, for data transfer from the processing elements PE1–PEn to the buffer memory BMAR, the transfer circuit TRC-S selects one-pixel data from the data over the data lines corresponding to h pixels. The selected one-pixel data is written to the buffer memory BMAR.

As described, the layout of the second embodiment is accomplished easily because the processing elements PE1–PEn may be located in the pitch of the data lines corresponding to h pixels.

FIGS. 4A and 4B show in detail a processing element equipped with Z buffer processing and alpha blending functions within the second embodiment of FIG. 2. Specifically, FIG. 4A illustrates input and output functions of the processing element, and FIG. 4B lists typical contents output by the processing element in response to different instructions. FIG. 5 depicts a typical constitution of the processing element.

In FIG. 4A, symbols (R, G, B, Z) stand for a pixel input from the buffer memory BMAR to the processing elements PE1–PEn; (R', G', B', Z') for the components of a pixel input from the serial memory SAMin; (R", G", B", Z") for the pixel after being processed; and Op-s/OP-m for the instruction for use in the SIMD/MIMD operation mode. Symbols R, R' and R" stand for the densities of red; G', G and G" for the densities of green; and B, B' and B" for the densities of blue. Symbols Z, Z' and Z" denote the coordinates of depth.

Depending on the content of the instruction received, each processing element PEi processes the pixel (R", G", B", Z") based on the pixel data input from the buffer memory BMAR to the element and on the components of the pixel input from the serial memory SAMin.

FIG. 4B shows typical contents output by the processing element in response to different instructions. Although the listed instructions are described in alphabet for the ease of understanding, they are actually defined in binary code.

In FIG. 4B, INS-z is the instruction for carrying out Z buffer processing. As indicated in FIG. 4B, this instruction compares Z with Z' and outputs the smaller pixel components. The effect of this is that an object at the front hides those behind.

(INS-α, α, β) is the instruction for executing alpha blending processing. As shown in FIG. 4B, this instruction takes a linear combination, weighted by coefficients α and β, of the components B, G and R of input two pixels and outputs the result. The effect of this is that an object behind those at the front is seen through. The degree of transparency is adjusted by varying the coefficients α and β. In this process, the smaller Z value is output.

NOP is a no-operation instruction that prevents the processing element from doing anything; the processing element outputs unchanged the pixel (R', G', B', Z') input from the serial memory SAMin. As mentioned earlier, this instruction may be supplied to an inactive part of the processing elements for processing the pixels in a single line upon update of the screen or in the MIMD operation mode. Fed with the NOP instruction, the inactive processing elements do nothing on the applicable pixel data; the remaining processing elements carry out their respective operations on the appropriate pixel data.

FIG. 5 depicts a typical constitution of the processing element. In FIG. 5, a data register REG-data is a register that accommodates temporarily input pixel elements and the coefficients for alpha blending processing. An instruction register REG-ins holds instruction codes and controls switches and circuits in accordance therewith. A comparator COM compares Z with Z' in value. A multiplier MT and an accumulator ACC are used as follows: in alpha blending processing, one of the two input terminals of the multiplier MT admits the values of R, R', G, G', B and B', and the other input terminal receives coefficients α and β. The multiplier takes a sum of products of the pixel data and the coefficients to calculate R", G", and B". The result is placed temporarily in the accumulator ACC. In the case of Z buffer processing, a switch WS-1 is activated. A switch SW-3 or SW-4 is also activated depending on the result of the comparator COM. As a result, if Z≦Z', then Z is selected for the output Z", and R, G and R are selected for the outputs R", G" and B" respectively. If Z>Z', then Z', R', G' and B' are selected for output (see FIG. 4B).

For alpha blending processing, the switches SW-1 and SW-5 are activated. This causes αR+βR', αG+βG' and αB+βB' to be selected for the outputs R", G" and B" respectively. If Z≦Z', then Z is selected for the output Z"; if Z>Z', then Z' is selected for output (see FIG. 4B).

In the case of the NOP instruction, the switches SW-2 and SW-3 are activated. This causes R', G', B' and Z' to be selected for the outputs R", G", B" and Z", respectively (see FIG. 4B).

As described, when the entire screen or the pixel data in a wide screen area are to be changed, the second embodiment selects the SIMD operation mode and performs parallel processing of the same kind one line at a time. Where the pixels in a limited screen area are subject to a drawing process using different parameters (e.g., polygon processing), the second embodiment selects the MIMD operation mode and carries out parallel processing per line on a plurality of polygons. This permits high-speed drawing of three-dimensional computer graphics. Illustratively, the second embodiment implemented as an image memory-based semiconductor chip may be incorporated in personal computers, game machines and portable data processing devices, among others. Used in such applications, the second embodiment permits the display of complicated three-dimensional images responding to commands in real time.

The processing element example shown in FIG. 5 must carry out product sum computations when alpha blending processing is to be executed. The product sum processing element of FIG. 5 comprises the multiplier MT and accumulator ACC. However, it should be noted that the multiplier generally occupies a wide area and, depending on the types of circuits used, it may be difficult to lay out the processing elements PEi in a narrow pitch.

The example in FIG. 6 includes shift registers and adders intended to accomplish product sum computations for alpha blending processing. This is a structure whereby the processing elements PEi can be laid out in a narrow pitch. In the setup of FIG. 6, individual pixel components (R, G, B) and (R', G', B') are each sent through a selector SELECT to shift registers SR1, SR2, SR3 and SR4. The example of FIG. 6 is one of blending the R and R' components in a ratio of one quarter α and three quarters β. It is assumed that, for the sake of explanation, the R and R' components are in binary notation, e.g., (00001100) and (00100000) respectively. When the R and R' components are sent to the shift registers SR1, SR2, SR3 and SR4, signals from the instruction decoder DEC cause SR1, SR3 and SR4 to shift right 2 bits, 1 bit and 2 bits, respectively. As a result, the output of SR1 becomes one quarter of the R component, the output of SR3 a half of the R component, and the output of SR4 a quarter of the R component.

These results are input via switches to the adders ADD1 and ADD2. In turn, the output of the adder ADD1 becomes a quarter of the R component, and the output of the adder ADD2 three quarters of the R' component. These outputs are further added by the adder ADD3. Specifically, adding the quarter of the R component (=α) and three quarters of the R' component (=β) provides the sum (00011011) as R". The G and B components are also calculated in like manner. Although the example above is one in which α=¼ and β=¾, the blend of the components may be changed as desired by suitably controlling the shift amounts and switch operations depending on the values of α and β (=¾, ¼; ½, ½; etc.). It should be noted that the number of bits in each shift register is larger than that of the input pixel component. This is intended to prevent an overflow upon shift operations.

As described, the second embodiment performs product sum computations for alpha blending processing using circuitry of only a limited scale (comprising shift registers, adders, etc.). This makes it possible to lay out the processing elements PEi in a small pitch setup.

As illustrated in FIG. 1, the parallel processor of the invention uses the group of processing elements PE1, PE2, ..., PEn to execute parallel processing in the SIMD or MIMD operation mode depending on the problem to be solved. The processing is carried out on numerous data items that are read parallelly from the two-dimensional memory array MAR formed on the same semiconductor substrate. In the SIMD operation mode, the processing elements execute the common instruction OP-s; in the MIMD operation mode, the processing elements execute a plurality of different instructions OP-m supplied from the instruction buffer BUF. The instructions OP-m for the upcoming MIMD process may be written to the instruction buffer BUF in advance while the processing elements are still performing the current SIMD or MIMD process. This eliminates time losses in switching between SIMD and MIMD operation modes in applications in which the two kinds of processing are mixed, whereby high-speed processing is achieved.

In connection with the two embodiments of the invention described above, FIGS. 1 and 2 omit detailed illustrations of the two-dimensional memory array. Also omitted are descriptions of how control signals are generated. The reason for the omissions is that these aspects of the invention are readily implemented by use of conventional LSI techniques.

For example, the two-dimensional memory array may be an SRAM array or a DRAM array made of one-transistor cells. The DRAM array, if used, can constitute a two-dimensional memory array of a higher degree of integration than the SRAM array or other memory arrays.

As described and according to the invention, the processing elements of the parallel processor are controlled efficiently in keeping with the degree of parallelism of the problem in question. This provides illustratively high-speed drawing of three-dimensional computer graphics. High-speed processing is also implemented where SIMD and MIMD operations are carried out continuously.

As many apparently different embodiments of this invention may be made without departing from the spirit and scope thereof, it is to be understood that the invention is not limited to the specific embodiments thereof except as defined in the appended claims.

What is claimed is:

1. A parallel processor formed on a semiconductor substrate, comprising:

a memory for storing data;

a plurality of processing elements for parallel processing the data in said memory;

a first bus for transferring at least one common instruction to said plurality of processing elements;

an instruction buffer for storing a plurality of instructions;

a plurality of second buses for transferring said plurality of instructions stored from said instruction buffer to said plurality of processing elements, respectively;

at least one switch for switching between a connection of said plurality of processing elements with (i) said first bus and (ii) said plurality of second buses;

a means for inputting new instructions into said instruction buffer concurrently with the plurality of processing elements executing parallel processing of the data from the memory based on said at least one common instruction;

a third bus for transferring the plurality of instructions;

a group of switches connected between said instruction buffer and said third bus; and a decoder for selecting a switch of said group of switches.

2. A parallel processor according to claim 1, wherein said memory includes a two-dimensional memory array to provide data to said plurality of processing elements and a serial access memory to provide data to said plurality of processing elements.

3. A parallel processor according to claim 2, wherein said serial access memory receives output data of said plurality of processing elements.

* * * * *